United States Patent [19]
Dlugos

[11] Patent Number: 5,815,274
[45] Date of Patent: Sep. 29, 1998

[54] METHOD FOR DIMENSIONAL WEIGHING BY SPACED LINE PROJECTION

[75] Inventor: Daniel F. Dlugos, Shelton, Conn.

[73] Assignee: Pitney Bowes Inc., Stamford, Conn.

[21] Appl. No.: 775,673

[22] Filed: Dec. 31, 1996

[51] Int. Cl.⁶ .......................... G01B 11/24; G01B 11/02; H04N 7/18
[52] U.S. Cl. .......................... 356/376; 356/379; 356/383; 356/384; 356/72; 364/560; 364/564; 364/567; 348/136
[58] Field of Search ............................ 356/376, 379–380, 356/383–384, 387, 397, 72–73; 382/101, 154; 348/136, 560; 364/562–564, 567

[56] References Cited

U.S. PATENT DOCUMENTS

| | | |
|---|---|---|
| 4,528,651 | 7/1985 | Brock et al. . |
| 4,535,782 | 8/1985 | Zoltan ..................................... 356/379 |
| 4,767,212 | 8/1988 | Kitahashi et al. ....................... 356/379 |
| 4,929,843 | 5/1990 | Chmielewski, Jr. et al. .......... 356/376 |
| 4,931,658 | 6/1990 | Tole . |
| 4,993,835 | 2/1991 | Inoue et al. ............................. 356/376 |
| 5,004,929 | 4/1991 | Kakimoki et al. . |
| 5,088,827 | 2/1992 | Kyriakis .................................. 356/372 |
| 5,102,223 | 4/1992 | Uesugi et al. .......................... 356/376 |
| 5,229,597 | 7/1993 | Fakutsu . |
| 5,289,261 | 2/1994 | Yogo ....................................... 356/376 |
| 5,305,895 | 4/1994 | Hermann ................................. 356/376 |
| 5,311,999 | 5/1994 | Malow et al. .......................... 209/583 |
| 5,325,178 | 6/1994 | Louis et al. ............................. 356/381 |
| 5,331,118 | 7/1994 | Jensen . |
| 5,367,378 | 11/1994 | Harding et al. ......................... 356/376 |
| 5,424,836 | 6/1995 | Weir et al. .............................. 356/376 |
| 5,469,262 | 11/1995 | Keen et al. ............................. 356/386 |
| 5,555,090 | 9/1996 | Schmutz ................................. 356/383 |

*Primary Examiner*—Frank G. Font
*Assistant Examiner*—Jason D. Vierra-Eisenberg
*Attorney, Agent, or Firm*—Charles R. Malandra; Melvin J. Scolnick

[57] ABSTRACT

The invention is a method and apparatus for measuring the dimensions of a parcel for use in a parcel processing application. The invention includes the placing of a parcel on a weighing scale. A movably mounted emitter apparatus projects lines of a known distance apart onto the parcel so that the number of lines may be counted by a scanner to determine a first linear dimension of the placed parcel. After the first count is performed, the emitter apparatus is rotated in place 90_ so as to project a second set of lines on the first surface of the placed parcel. The second set of lines is then counted so as to determine a second linear dimension of the placed parcel. After the second count is performed, the emitter apparatus is moved so as to project a third set of lines on a second surface of the parcel, wherein the second surface is perpendicular to the first surface. The third set of lines is counted to determine the third linear dimension of the placed parcel. Counts one, two, and three are transmitted to a data processing device which applies the counts to a look-up table to determine a set of linear dimensions for the placed parcel. The linear dimensions and the weight are transmitted to the parcel processing application for further use within that system.

14 Claims, 4 Drawing Sheets

METHOD FOR DIMENSIONAL WEIGHING BY SPACED LINE PROJECTION

RELATED APPLICATIONS

Reference is made to application Ser. No. 08/775,850, (Attorney Docket No. E-376), entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672, (Attorney Docket No. E-377), entitled METHOD FOR DIMENSIONAL WEIGHING UTILIZING POINT DETERMINATION, assigned to the assignee of this application and filed on even date herewith.

Reference is made to application Ser. No 08/775,671, (Attorney Docket No. E-379), entitled METHOD FOR DIMENSIONAL WEIGHING WITH OPTICS, assigned to the assignee of this application and filed on even date herewith.

Reference is made to application Ser. No. 08/775,851, (Attorney Docket No. E-383), entitled LOW COST DIMENSIONAL DETERMINING SYSTEM, assigned to the assignee of this application and filed on even date herewith.

Reference is made to application Ser. No. 08/775,851, (Attorney Docket No. E-384), entitled COARSE VOLUME MEASUREMENT WITH INTERLOCK, assigned to the assignee of this application and filed on even date herewith.

Reference is made to application Ser. No. 08/775,675, (Attorney Docket No. E-385), entitled AUTOMATIC DIMENSIONAL WEIGHING, assigned to the assignee of this application and filed on even date herewith.

Reference is made to application Ser. No. 08/775,550, (Attorney Docket No. E-386), entitled DIMENSIONAL WEIGHING UTILIZING A FOLLOWING ARM MECHANISM, assigned to the assignee of this application and filed on even date herewith.

Reference is made to application Ser. No. 08/775,214, (Attorney Docket No. E-387), entitled DIMENSIONAL WEIGHING UTILIZING A LINEAR DISPLACEMENT TRANSDUCER, assigned to the assignee of this application and filed on even date herewith.

Reference is made to application Ser. No. 08/775,213, (Attorney Docket No. E422), entitled APPARATUS AND METHOD FOR DIMENSIONAL WEIGHING UTILIZING A ROTATING SENSOR, assigned to the assignee of this application and filed on even date herewith.

Reference is made to application Ser. No. 08/775,674, (Attorney Docket No. E430), entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The increased efficiencies brought by the improvements in data processing systems has helped foster increased competition among parcel and package carriers. There has been a great expansion of the services offered to shippers and in the calculation of shipping charges available to both the casual shipper and the high volume shipper. The challenge that carriers face is to develop a method of charging for carrier services that more closely reflects the reality of what shippers actually need in the way of carriage services. The development of certain efficiencies of transport and materials handling together with electronic invoicing and parcel tracking, has created an environment where carriers are now able to offer shippers mixed modes of transport, overnight delivery, better tracking of parcel movement, and discount rates in return for the utilization of labor and cost saving measures such as: bar coding; bulk delivery; pre-sorting; and, dimensional weighing.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE-DIMENSIONAL SHAPE; issued Apr. 2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

The use of incremental measure to determine dimension has, in a general fashion, long been known in the art; but, advancements in the data processing arts have created efficiencies of measure, calculation, and application that are only recently coming into use. For instance, the use of slit light to determine the extent of curvature of surface shape is disclosed in U.S. Pat. No. 5,102,223, issued Apr. 7, 1992 to Uesugi et al. (Uesugi). Uesugi discloses a method and apparatus for projecting slit light onto a curved surface to code that surface for position, time, or light projecting angle and then comparing the resulting image with an image of a non-curved surface to create a composite which is measurable in terms of variance form a norm. While Uesugi provides an excellent means for producing measurable composites, it is not an efficient means for providing dimensional determination of parcels because of the inherent expense, in time and cost, of producing composites.

The use of sound has been employed in several ways in making dimensional determinations. Long a staple of the Naval forces in locating ships, and now commonly utilzed for identifying the location of schools of fish, sound waves can be readily measured to determine the location of points relative to a starting or neutral position. An example of the use of sound in determining the linear measurement of objects is U.S. Pat. No. 4,528,651, issued on Jul. 9, 1985 to Brock et al. (Brock). Brock teaches the measurement of objects, preferably cylindrical, by passing the objects through an array of transducers that perform echo ranging to determine length and diameter. Rectangularly shaped objects or parcels would be limited to only the measurements of length and height.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are sited along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method and apparatus for measuring the dimensions of a parcel for use in a parcel processing application.

The method comprises a number of steps that begin with the placing of a parcel on an essentially flat surface in a field of measurement; the flat surface is preferably the weighing surface of a scale capable of calculating the weight of the placed parcel. Once the parcel has been placed within the measurement field, a movably mounted emitter apparatus projects lines of a known distance apart onto the parcel. The emitter apparatus is capable of being moved so as to project a first set of lines onto a first surface of the placed parcel, wherein the lines may be counted by counting means to determine a first linear dimension of the placed parcel.

A first count is performed on the first set of lines by a scanner and transmitted to a data processing device having a parcel processing application. After the first count is performed, the emitter apparatus is rotated in place 90 so as to project a second set of lines on the first surface of the placed parcel; the second set of lines are perpendicular to the lines that were previously projected. The second set of lines is then counted so as to determine a second linear dimension of the placed parcel and the second count is transmitted to the data processing device.

After the second count is performed, the emitter apparatus is moved so as to project a third set of lines on a second surface of the parcel, wherein the second surface is perpendicular to the first surface. The third set of lines is counted by the counting means to determine the third linear dimension of the placed parcel. A third count is then performed on the third set of lines and the count is transmitted to the data processing device.

The data processing device applies the three counts to a look-up table in a memory of the data processing device to determine a set of linear dimensions for the placed parcel. Additionally, the calculated length, width, height, and weight may be displayed on a display or on a monitor. The calculated length, width, height, and weight are then transmitted to a memory of the parcel processing system for further use within that system.

In an alternative embodiment of the present invention, the line emitter is not rotated in place to obtain the second count but is moved into position to emit lines onto a third surface that is at right angles to both surfaces one and two.

The invention apparatus comprises supporting means for supporting the parcel placed thereupon for measurement; the supporting means is preferably the weighing surface of a scale capable of calculating a weight of the placed parcel. The apparatus further comprises line emitting means for projecting a first set of lines of known distance apart upon a first surface of the placed parcel, wherein the line emitting means is movably mounted so as to be rotated at least 90 to project a second set of lines on the parcel surface wherein the second set of lines is perpendicular to the first set of lines. The line emitting means can be moved so as to project a third set of lines on a second surface of the placed parcel, wherein the second surface is perpendicular to the first surface.

The line emitter means can be a CCD array or a laser beam array comprising a rotating, oscillating, or holographic lens for projecting the emitted lines upon said the first and second surfaces of the placed parcel In addition to emitting means, the apparatus comprises counting means for counting the number of emitted lines of each of the three sets of lines. The emitter means and the counting means are preferably co-located. The counting means comprises a scanner capable of reading the emitted lines visible on the parcel surfaces and maintaining a count of the number of emitted lines read on those surfaces.

Transmission means transmit each of the three counts to the data processing system. The data processing system comprises data processing means for controlling the line emitting means, and for receiving and essentially simultaneously processing measurement data received from the counting means. Additionally, the data processing means comprises calculator means for calculating the linear dimensions of the placed parcel by applying the measurement data to a pre-determined look-up table to determine a linear measurement value for each linear dimension of the placed parcel; and, transmitting means for transmitting the measurement data to the calculator means; and, for transmitting the linear measurement values to a display or monitor means and to a memory of the parcel processing application.

DETAILED DESCRIPTION OF THE PREFERRED EMBODIMENTS

Figure 1:
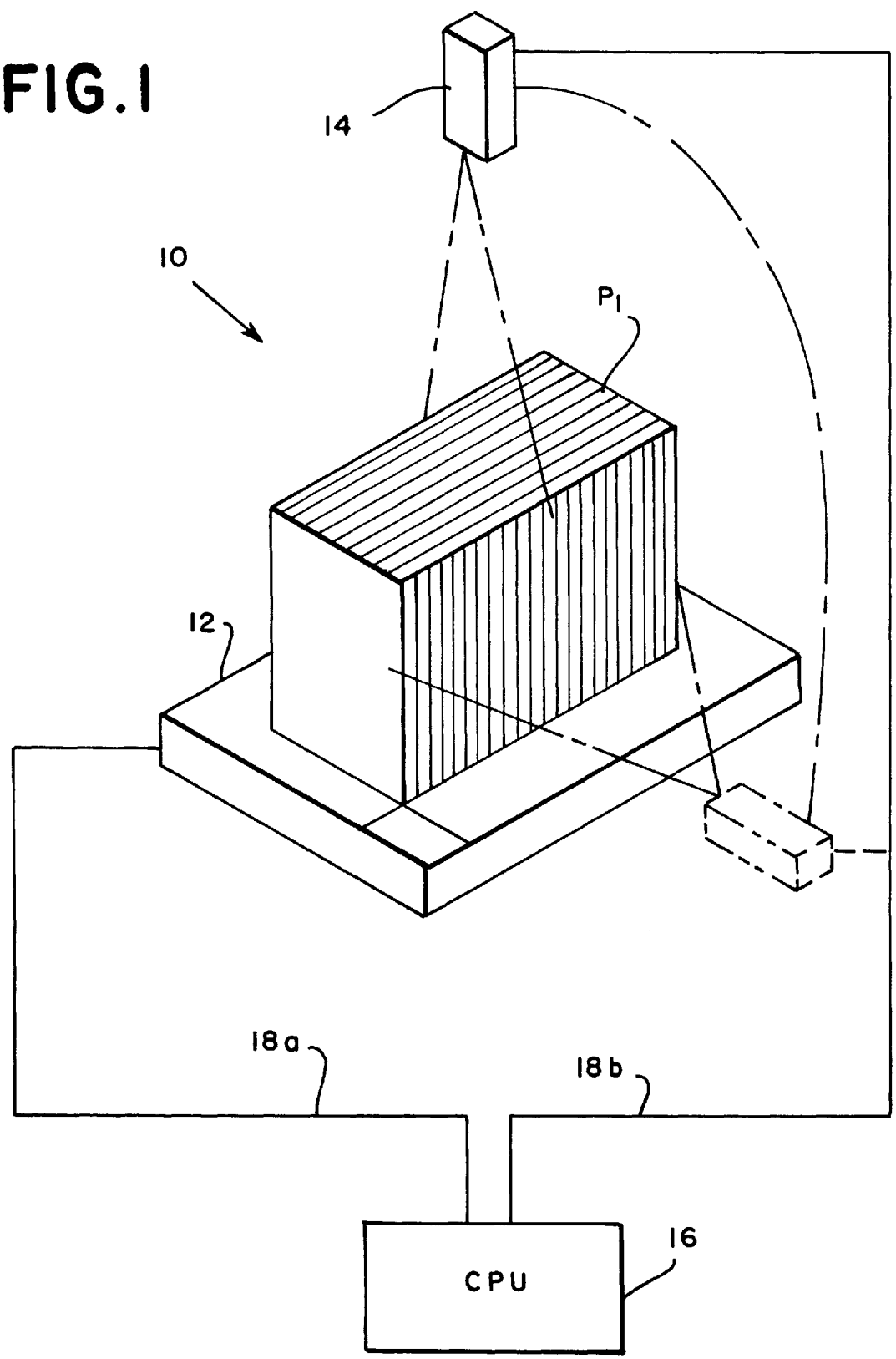
FIG. 1 is a drawing of a preferred embodiment of the apparatus utilizing a line emitting apparatus in two positions.

Turning to FIG. 1, there is shown a preferred embodiment of the present invention wherein a representative parcel $P_1$ is placed on platform 12 within a field of measurement. The field of measurement is designated as system 10.

Platform 12 is preferably a weighing scale for determining the weight of objects placed thereupon. Platform 12 is operatively connected to a data processing system, hereinafer referred to as CPU 16, via interface cable 18a. The platform, if a weighing scale, transmits weight data to CPU 16 over interface cable 18a.

Movably mounted above platform 12 is emitter/counter apparatus 14 connected to CPU 16 by interface cable 18b. Preferably co-located with the emitter apparatus are counting means for counting lines projected on the surface of parcel $P_1$. Emitter/counter apparatus 14 can comprise one of several embodiments, each of which is capable of emitting a set of lines defined by the presence of beams of light upon the parcel surface to which the beams are directed. These embodiments include the use of a CCD array or a laser beam array. The lines are created by splitting a beam into a plurality of sub-beams that form lines on the parcel surface. The beam is split by directing the beam through a collimator lens. In the alternative, the beam can be directed off of an oscillating or rotating mirror, or off of a holographic mirror. The variations are well known in the optical arts and need not be discussed here for an understanding of the nature of the present invention.

As the beams are projected onto the parcel surface, counting means co-located with emitting apparatus 14 maintain the desired distance between the beams by measuring the width between the spaced lines and compensating for the beam split if the distance between the lines increases or decreases. The counting means counts the number of lines on the parcel surface and transmits the data over interface cable 18b to CPU 16. This movement of emitter/counter apparatus 14 is designated movement D1.

Movement D1 is completed when the count of the lines is completed. Emitter/counter apparatus 14 is then rotated in place 90_ and a new set of lines is projected down upon parcel $P_1$. The lines being projected are now perpendicular to the lines previously projected during movement D1. Emitter/counter apparatus 14 counts the lines on the surface of parcel $P_1$ and transmits the data over interface cable 18b to CPU 16; this movement of emitter/counter apparatus 14 is designated movement D2.

Movement D2 is completed when the count of the lines is completed. Emitter/counter apparatus 14 is then moved so that the emitted lines are projected onto one of the four sides of the parcel that meet the previously measured surface at right angles. The lines being projected are now perpendicular to the lines previously projected during movements D1 and D2. Emitter/counter apparatus 14 counts the lines on the surface of parcel $P_1$ and transmits the data over interface cable 18b to CPU 16; this movement of emitter/counter apparatus 14 is designated movement D3.

CPU 16 comprises means for controlling emitter/counter apparatus 14; as well as for receiving and essentially simultaneously processing measurement data from emitter/counter apparatus 14. CPU 16 further comprises calculator means for calculating the linear dimensions of the placed parcel; this is accomplished by transmitting the measurement data to the calculator means to determine linear measurements by applying the measurement data to a predetermined look-up table to determine a linear measurement value for each linear dimension of representative parcel $P_1$. CPU 16 is also capable of transmitting the linear measurement values to display or monitor; and, to a memory of the parcel processing application.

Figure 2:
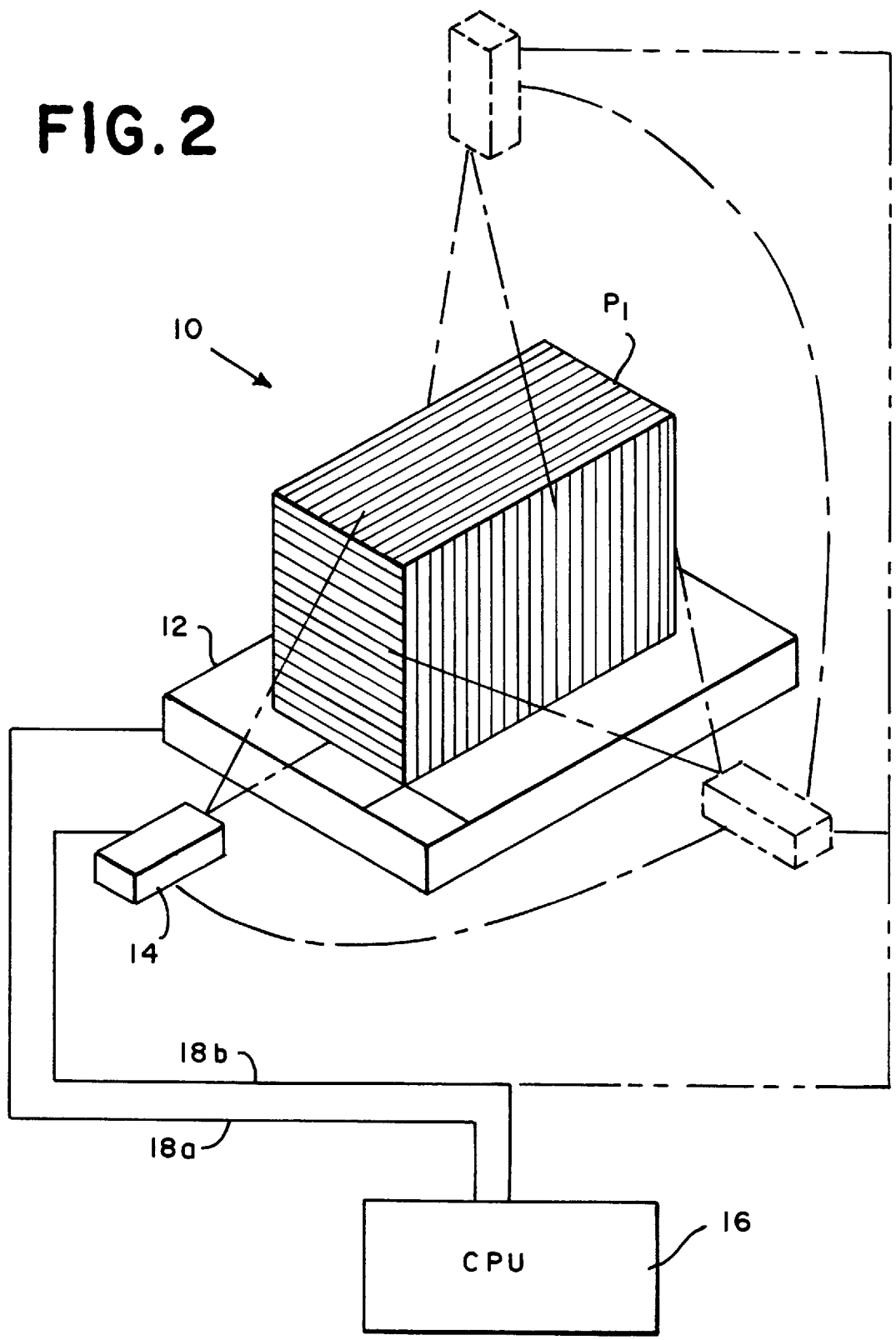
FIG. 2 is an alternative embodiment of the apparatus of FIG. 1 utilizing a line emitting apparatus in three positions.

Turning now to FIG. 2, there is shown an alternative embodiment of the system of FIG. 1 wherein emitter/counter 14 is not rotated in place after movement D1, but is instead moved directly to movement D3. From movement D3, the system progresses to movement D4.

In movement D4, emitter/counter apparatus 14 is moved so that the emitted lines are projected onto one end of the parcel of the parcel that meets the two previously measured surfaces at right angles. The lines being projected are now perpendicular to the lines previously projected during movements D1 and D3. Emitter/counter apparatus 14 counts the lines on the surface of parcel $P_1$ and transmits the data over interface cable 18b to CPU 16.

Figure 3A:
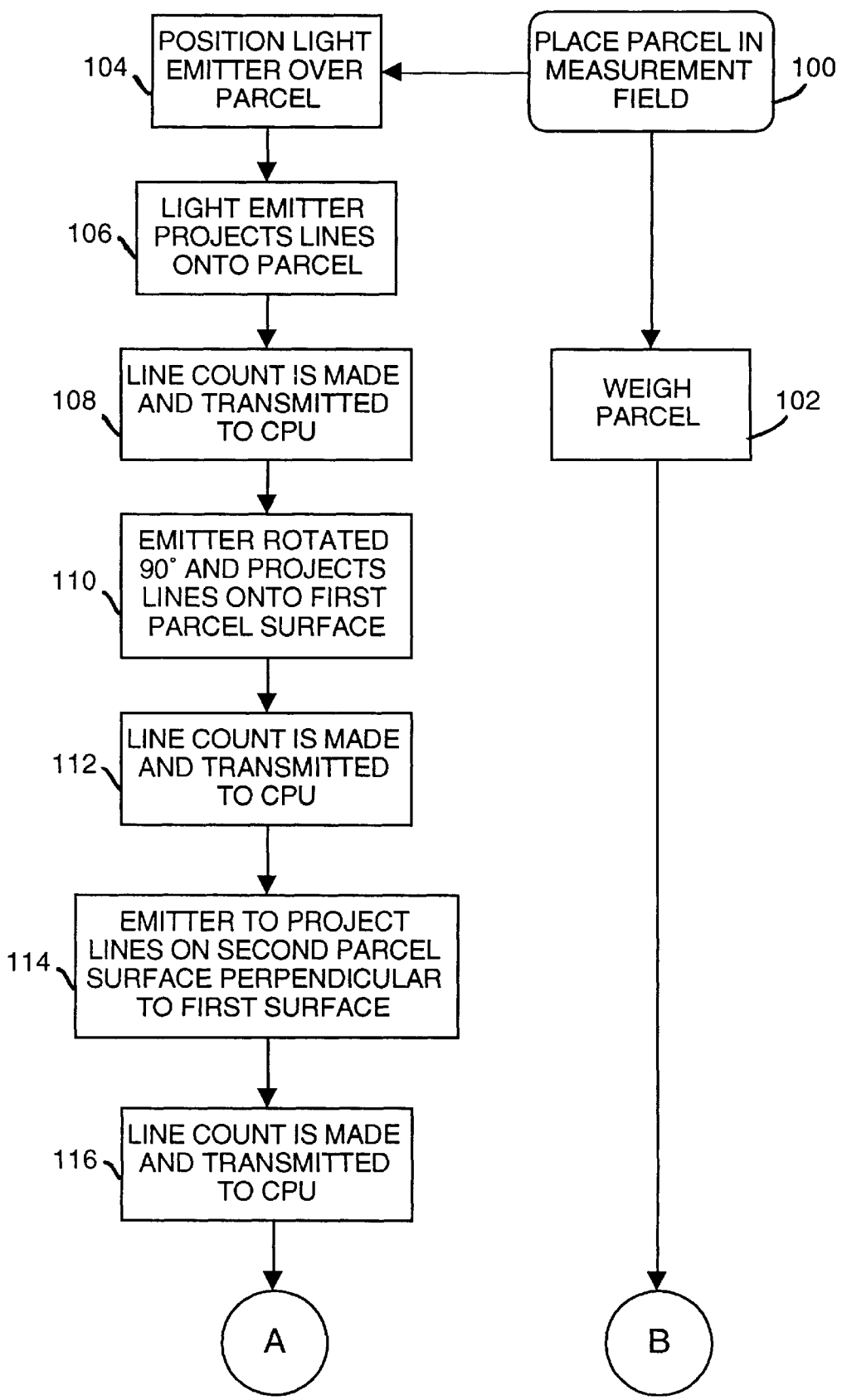
FIG. 3 is a flowchart of the method of the present invention.
Figure 3B:
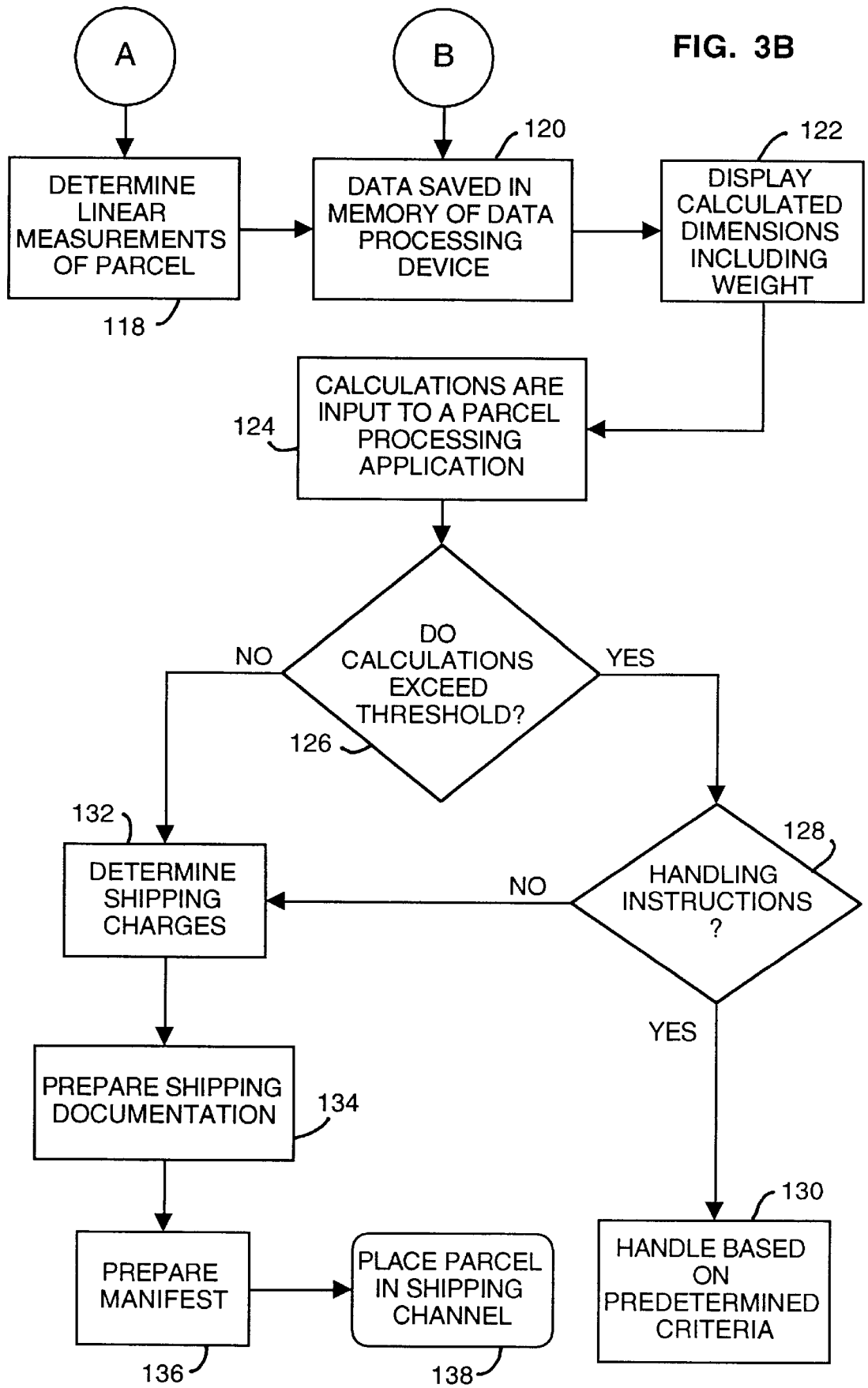

The method of the present invention is shown in the flowchart of FIGS. 3A and 3B. Turning to FIG. 3A, the method begins at step 100 where the parcel to be measured is placed on top of a platform within the field of measurement. From step 100, the method advances essentially simultaneously to steps 102 and 104. If the platform upon which the parcel has been placed is the surface of a weighing scale, then the weighing scale will determine the weight of the parcel at step 102 before advancing along path B to step 120, as shown in FIG. 3B, where the weight data is stored in a memory of a data processing system. If the platform upon which the parcel has been placed is not the surface of a weighing scale, then the method will not perform step 102.

As the parcel is being weighed at step 102, or if the platform is not the surface of a weighing scale, the method performs step 104 where the emitter/counter apparatus is positioned above the parcel to be measured. The method then advances to step 106 where the emitter/counter apparatus emits a split beam of light onto the parcel surface wherein the split beam forms equally spaced lines of known distance upon the parcel surface.

From step 106, the method advances to step 108 where a counting apparatus makes a count of the lines projected upon the parcel surface and transmits the count data to a data processing device. The method advances from step 108 to step 110 where the emitter/counter apparatus is rotated in place 90_ before emitting a split beam of light onto the parcel surface wherein the split beam forms equally spaced lines of known distance upon the parcel surface The now projected lines are perpendicular to the lines that had been previously projected onto the parcel surface. The method then advances to step 112.

At step 112, the counting apparatus makes a count of the lines projected upon the parcel surface and transmits the count data to the data processing device. The method then advances to step 114 where the emitter/counter apparatus is moved so that the emitted lines are projected onto one of the four sides of the parcel that meet the previously measured surface at right angles. The lines being projected are now perpendicular to the lines previously projected during the first two counting movements. The method procedes to step 116 where the counter apparatus counts the lines on the surface of the parcel and transmits the data over the interface cable to the data processing device.

The method advances from step 116 along path A to step 118 as shown in FIG. 3B. At step 118, the linear dimensions of the parcel are determined by applying the line counts to a look-up table to determine a linear measurement. Step 118 then advances to step 120 where the calculations derived from the measurement of the parcel's length, width, height, and weight are stored within a memory of the data processing device for subsequent use in a parcel processing application program. From step 120, the method advances to step 122 where the stored data is distributed, under control of the CPU's application program, and the system displays the calculated dimensions and weight of the parcel to be processed. Essentially simultaneously to step 122, the calculations are input to a parcel processing application within the data processing device at step 124 which applies the data against a look-up table of values that correspond to a shipping charge as determined by a carrier's dimensional weighing guidelines.

From step 124, the method advances to a query at step 126 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 126 is "YES," then the method advances to a query at step 128 which asks if there are special handling instructions associated with a parcel corresponding to the measurements of the subject parcel. If the response to the query is "NO," then the method advances to step 132. If the response to the query at step 128 is "YES," however, then the method advances directly to step 130 where the parcel is further handled according to predetermined criteria which may include: rejection of the parcel by the carrier; alternate means of carriage; application of a different table of values for determining carriage charges; or, application of a service charge.

Returning to step 126, if the response to the query at step 126 is "NO," however, then the method advances to step 132 where shipping charges are determined in respect of the parcel's dimensions and any other criteria established within the application program's data table values. From step 132, the method advances to step 134 where the system prepares shipping documentation which might comprise: shipping labels; waybills; and appropriate barcoding. The method then prepares a carrier manifest, at step 136, indicative of parcels prepared for shipping. The method then advances to step 138 where the parcel is placed into its proper shipping channel.

As can be appreciated by those skilled in the art, a number of variations of the subject invention are possible. These variations include, but are not limited to: the desired distance between spaced lines; the capabilities of the parcel processing application; the extent to which the platform is pre-calibrated; the use of varied emitter and scanner arrays; the supporting means for supporting the emitter/counter apparatus as it is moved about the parcel to be measured; and, the use of conveyors of varied ability to propel the parcel through the field of measurement. If a conveyor is used to move parcels through the field of measurement, then the capabilities of the weighing platform will necessarily be altered to accommodate weigh in motion requirements.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method for measuring the dimensions of a parcel for use in a parcel processing application of a data processing device and comprising the steps of:

(a) placing a parcel on an essentially flat surface in a field of measurement; wherein a movably mounted emitter apparatus projects lines of a known distance apart on said placed parcel;

(b) moving said emitter apparatus so as to project a first set of lines on a first surface of said placed parcel wherein said lines may be counted by a counting means to determine a first linear dimension of said placed parcel;

(c) performing a first count on said first set of lines and transmitting said first count to a data processing device;

(d) rotating said emitter apparatus in place 90 degrees so as to project a second set of lines on said first surface of said placed parcel that are perpendicular to the lines that were projected in step 1(b), wherein said second set of lines may be counted by said counting means to determine a second linear dimension of said placed parcel;

(e) performing a second count on said second set of lines and transmitting said second count to said data processing device;

(f) moving said emitter apparatus so as to project a third set of lines on a second surface wherein said second surface is perpendicular to said first surface and, wherein said third set of lines may be counted by said counting means to determine a third linear dimension of said placed parcel;

(g) performing a third count on said third set of lines and transmitting said third count to a data processing device; and (h) applying said first count, said second count, and said third count to a look-up table in a memory of said data processing device to determine a set of linear dimensions for said placed parcel.

2. The method of claim 1, wherein said essentially flat surface is the weighing surface of a scale capable of calculating a weight of said placed parcel.

3. The method of claim 2, wherein said calculated weight is displayed on said display or on said monitor.

4. The method of claim 2, wherein said calculated weight is transmitted to said parcel processing system.

5. The method of claim 1, wherein said set of linear dimensions comprise calculated length, width, and height dimensions and wherein said calculated length, width, and height dimensions are displayed on a display or on a monitor.

6. The method of claim 1, wherein said set of linear dimensions comprise calculated length, width, and height dimensions and wherein said calculated length, width, and height dimensions are transmitted to a parcel processing system within said data processing device.

7. An apparatus for measuring the dimensions of a parcel, for use in a parcel processing application of a data processing system, comprising:

(a) supporting means for supporting a parcel placed thereupon for measurement;

(b) line emitting means for projecting a first set of lines of known distance apart upon a first surface of said placed parcel, wherein said line emitting means is movably mounted so as to be rotated at least 90 degrees to project a second set of lines on said first surface wherein said second set of lines is perpendicular to said first set, and wherein said line emitting means can be moved so as to project a third set of lines on a second surface of said placed parcel, wherein said second surface is perpendicular to said first surface;

(c) counting means for obtaining: a first count comprising the number of lines of said first set of emitted lines, a second count comprising the number of lines of said second set of emitted lines, and a third count comprising the number of lines of said third set of emitted lines;

(d) transmission means for transmitting said first count, said second count, and said third count to said parcel processing system; and (d) data processing means for:
  (i) controlling said line emitter means;
  (ii) receiving and essentially simultaneously processing measurement data from said counting means;
  (iii) calculator means for calculating the linear dimensions of said placed parcel;
  (iv) transmitting said measurement data to said calculator means to determine linear measurements by applying said measurement data to a pre-determined look-up table to determine a linear measurement value for each linear dimension of said placed parcel; and
  (v) transmitting, said linear measurement values to display means; and to a memory of said parcel processing application.

8. The apparatus of claim 7, wherein said essentially flat surface is the weighing surface of a scale capable of calculating a weight of said placed parcel.

9. The apparatus of claim 7, wherein said line emitter means and said counting means are co-located.

10. The apparatus of claim 7, wherein said line emitter means comprises a CCD array further comprising a rotating lens for projecting said emitted lines upon said first and said second surfaces of said placed parcel.

11. The apparatus of claim 7, wherein said line emitter means comprises a CCD array further comprising an oscillating lens for projecting said emitted lines upon said first and said second surfaces of said placed parcel.

12. The apparatus of claim 7, wherein said line emitter means is a laser beam emitter comprising a rotating lens for projecting said emitted lines upon said first and said second surfaces of said placed parcel.

13. The apparatus of claim 7, wherein said line emitter means is a laser beam emitter comprising an oscillating lens for projecting said emitted lines upon said first and said second surfaces of said placed parcel.

14. The apparatus of claim 7, wherein said counting means comprises a scanner capable of reading said emitted lines and maintaining a count of the number of emitted lines read on said first and said second surfaces of said placed parcel.

* * * * *